E. WHELAN.
Lamp.
No. 3,966. Patented March 26, 1845.
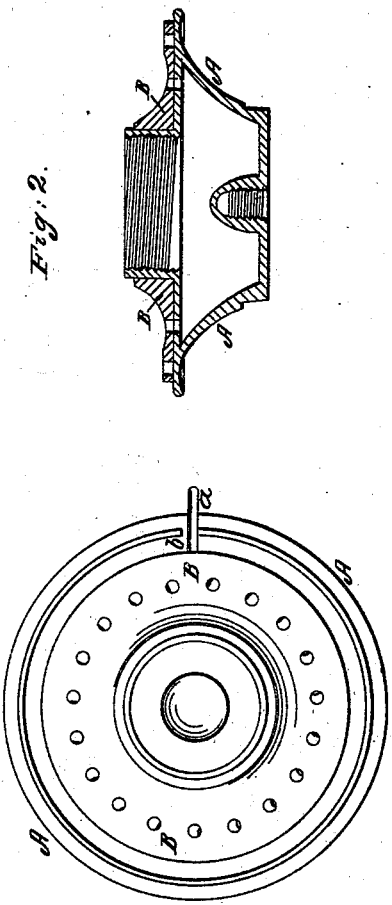

UNITED STATES PATENT OFFICE.

E. WHELAN, OF PHILADELPHIA, PENNSYLVANIA.

REGULATING THE INTERIOR DRAFT OF LAMPS.

Specification of Letters Patent No. 3,966, dated March 26, 1845.

*To all whom it may concern:*

Be it known that I, E. WHELAN, of the city of Philadelphia, in the State of Pennsylvania, have made a new and useful improvement in drip-cups used for receiving waste oil from lamps and also for admitting a draft of air to the interior of the wick, which improved article I denominate the "valve drip cup"; and I do hereby declare that the following is a full and exact description thereof.

My improvement is applicable, and is intended to be applied, to solar lamps which have high, conical chimneys, or burners, say of twelve inches, more or less. In lamps of this description, it is difficult to regulate the height and intensity of the flame by simply raising, or lowering, the wick; and this difficulty I have obviated by so constructing the drip-cup as to regulate, with great precision, the supply of air to the interior of the wick. For this purpose, I make the upper part of my drip-cup in two pieces, one of which shall swivel, or revolve, to a limited extent, on the other, in the manner of circular registers for regulating the draft in stoves, or the admission of heated air into apartments. In each of these pieces, there is a series of similar holes, set around in a circle, which may be made to coincide when a full supply of air is to be admitted, and may be closed to any extent required for regulating the draft, there being a check-pin, or stop, to prevent said openings from being entirely closed, as a small portion of air is to be admitted under all circumstances.

In the accompanying drawing, Figure 1, is a top view of my drip-cup, and Fig. 2, a vertical section of it through the middle. The part A, A, is so made as to constitute a cup of the ordinary kind, being furnished with a series of holes through which air may pass to its interior. The part B, B, is made to fit upon the part A, A, and is allowed to turn back and forth upon it to a distance nearly equal to the diameter of the holes for the admission of air. A check-pin, *a*, attached to the piece B, is received within a notch *b*, on the part A. As represented in Fig. 1, the draft holes are as nearly closed as the check-pin will admit; and when the check-pin is made to bear on the other side of the notch, the holes shown in the piece B, will coincide with those shown by the dotted lines in the piece A.

The addition of this improvement to the solar lamp is of signal advantage, as by closing the valve, or register, to a proper extent, a high flame and a good light are obtained, and that in the lard lamp immediately after it has been lighted, without the necessity of waiting ten or fifteen minutes for the melting of the lard. By thus stopping the current of cold air, the lard is much more rapidly fused; the wick, also, will last for a much longer time, and will require trimming less frequently than when the draft is not thus regulated. When the flame of a lamp, after burning several hours, begins to decline, it may be raised by simply closing the valves to the proper extent, still leaving the wick untouched.

Having thus, fully described the nature of my improvement in the drip cup of the solar lamp, what I claim as new therein, and desire to secure by Letters Patent, is—

The combining with the draft holes of such a cup, a rotating, or other valve, or air regulator, which is capable of being nearly, but not entirely, closed; such as is herein described, and substantially in the manner, and for the purpose, above set forth.

I do not claim such a valve, or regulator of the draft, as new in itself, but limit my claim to the combination thereof with the drip-cup of a solar lamp.

E. WHELAN.

Witnesses:
 Ro. PENN SMITH,
 ROBT. COWELL.